(12) United States Patent
Sheng et al.

(10) Patent No.: US 11,360,319 B2
(45) Date of Patent: Jun. 14, 2022

(54) LIGHT TUNNEL

(71) Applicant: Texas Instruments Incorporated, Dallas, TX (US)

(72) Inventors: Zhongyan Sheng, Allen, TX (US); Don Holamon, Rockwall, TX (US); Steven Edward Smith, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 228 days.

(21) Appl. No.: 16/808,819

(22) Filed: Mar. 4, 2020

(65) Prior Publication Data

US 2020/0201059 A1  Jun. 25, 2020

Related U.S. Application Data

(63) Continuation-in-part of application No. 16/520,249, filed on Jul. 23, 2019.

(60) Provisional application No. 62/813,865, filed on Mar. 5, 2019, provisional application No. 62/702,739, filed on Jul. 24, 2018.

(51) Int. Cl.
 *G02B 27/09* (2006.01)

(52) U.S. Cl.
 CPC ..... *G02B 27/0994* (2013.01); *G02B 27/0977* (2013.01)

(58) Field of Classification Search
 CPC .......................... G02B 27/0994; G02B 27/0977
 See application file for complete search history.

(56) References Cited

U.S. PATENT DOCUMENTS

2007/0091231 A1* 4/2007 Sumi ................. G02F 1/133553
349/98

FOREIGN PATENT DOCUMENTS

| DE | 19703586 A1 | 8/1998 |
| EP | 0362864 A2 | 4/1990 |
| WO | 2004086120 A2 | 10/2004 |

(Continued)

OTHER PUBLICATIONS

Product Data Sheet, "Fine Aluminum Surfaces", ANOMET Inc., Ontario, Canada, 2020, retrieved from the world wide web at uniform resource locator (url) anomet.com/Anomet-Standard-Stock-Sheet.pdf on Mar. 4, 2020.

(Continued)

*Primary Examiner* — James C. Jones
(74) *Attorney, Agent, or Firm* — Michelle F. Murray; Charles A. Brill; Frank D. Cimino

(57) ABSTRACT

Described examples include a light tunnel of a material, the light tunnel including: a first section having a first surface and an opposing second surface, a second section having a third surface and an opposing fourth surface, a third section having a fifth surface and an opposing sixth surface, and a fourth section having a seventh surface and an opposing eighth surface; a first crease between the first section and the second section, a second crease between the second section and the third section, a third crease between the third section and the fourth section, and an intersection between an end of the first section and the fourth section; and a reflective coating forming a reflective surface on the first, third, fifth and seventh surfaces, the reflective surface being continuous across at least one of the creases, and the reflective coating being discontinuous at the intersection.

29 Claims, 11 Drawing Sheets

(56) References Cited

FOREIGN PATENT DOCUMENTS

| | | |
|---|---|---|
| WO | 2006023751 A2 | 3/2006 |
| WO | 2010133822 A1 | 11/2010 |

OTHER PUBLICATIONS

Product Data Sheet, "Aluminum Surfaces-Reflective Aluminum", ANOMET Inc., Ontario, Canada, 2020, retrieved from the world wide web at uniform resource locator (url) anomet.com/reflective-aluminum on Mar. 4, 2020.

International Search Report dated Jun. 4, 2020, PCT Application No. PCT/US2020/021226, 3 pages.

Written Opinion dated Jun. 4, 2020, PCT Application No. PCT/US2020/021226, 7 pages.

\* cited by examiner

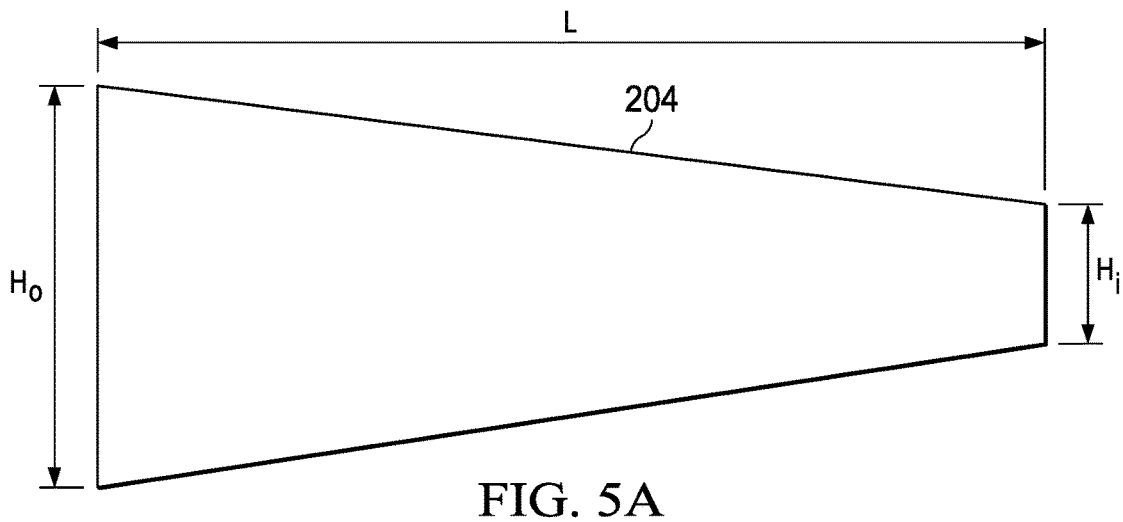
FIG. 5A
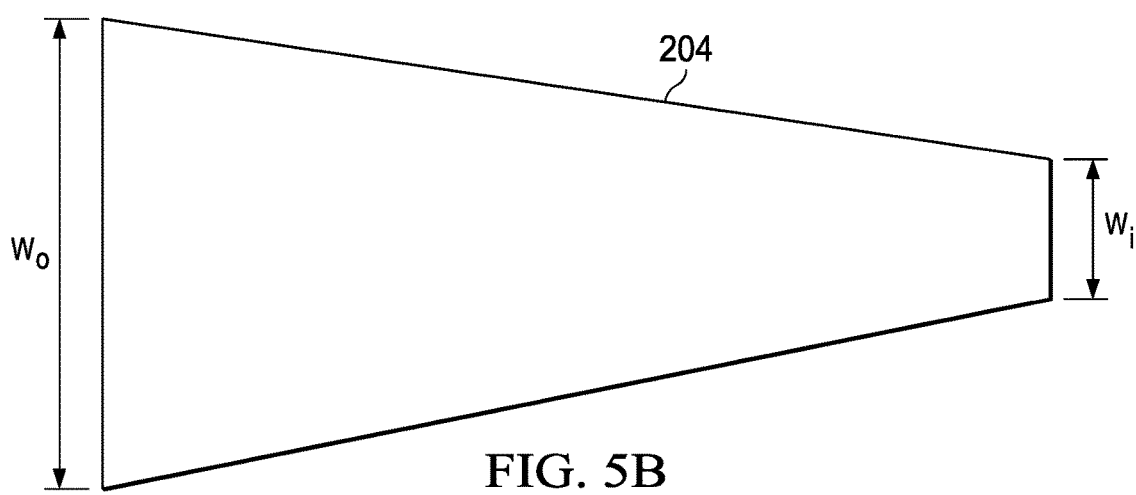
FIG. 5B
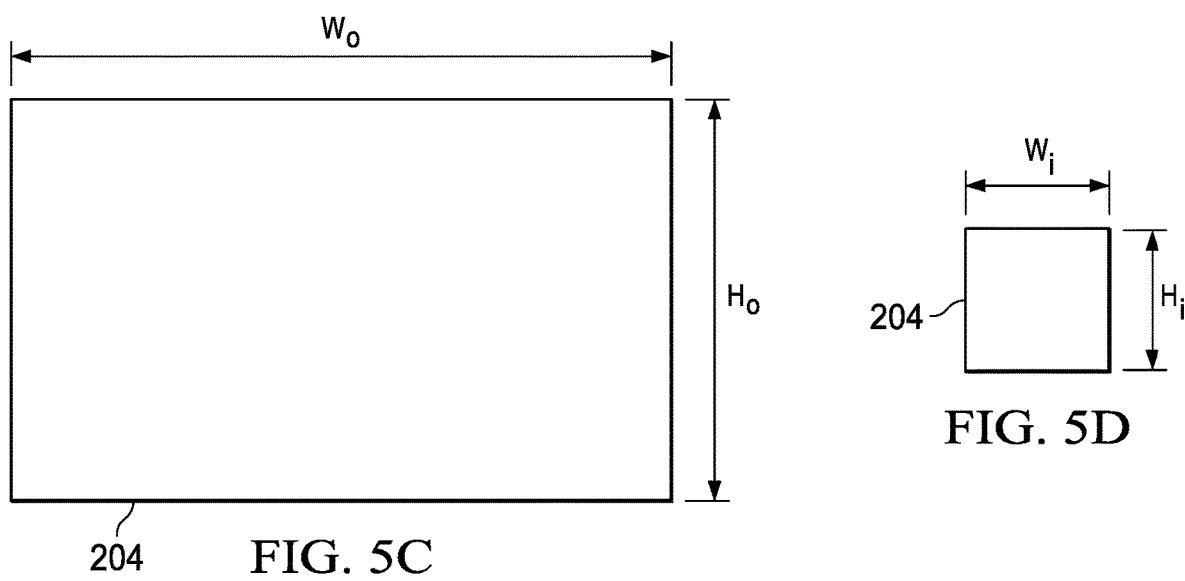
FIG. 5C
FIG. 5D

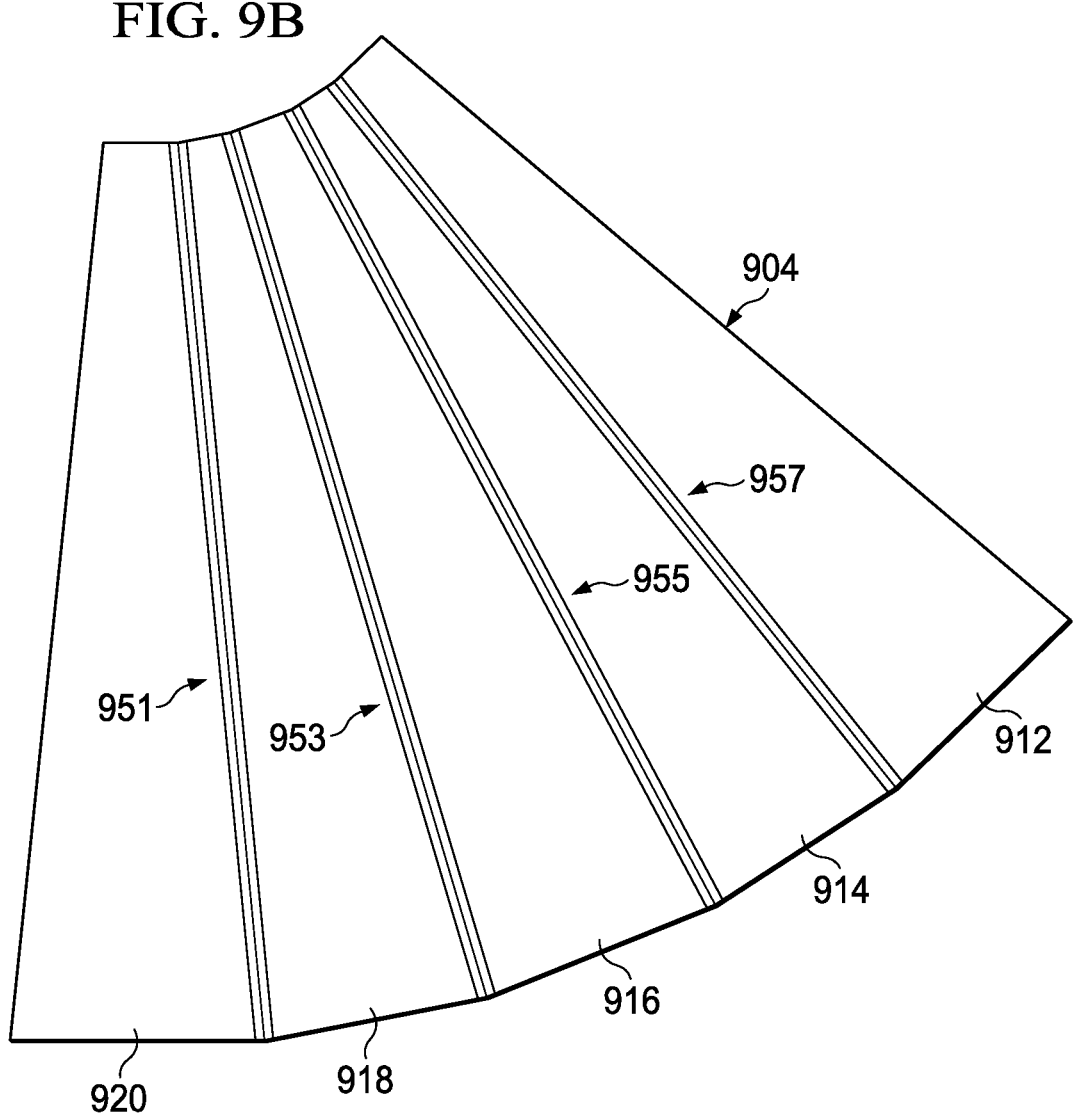

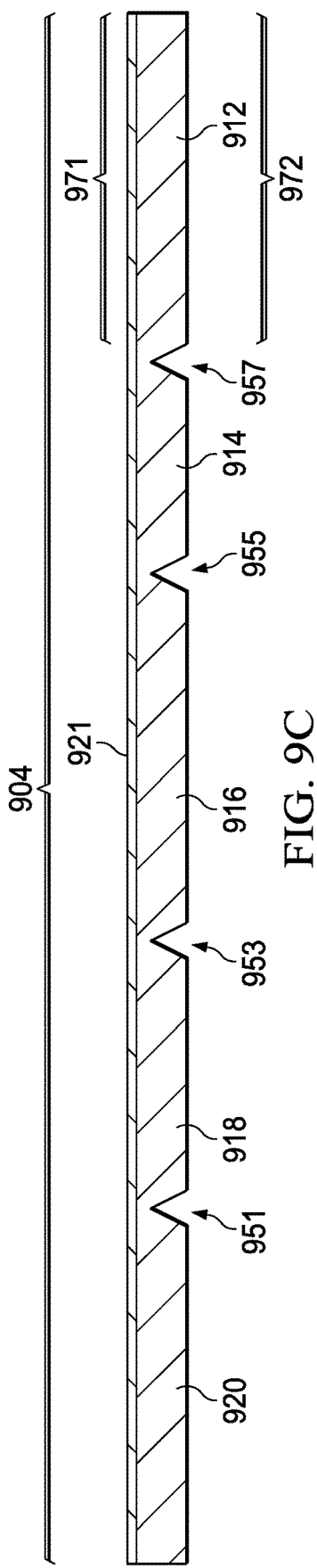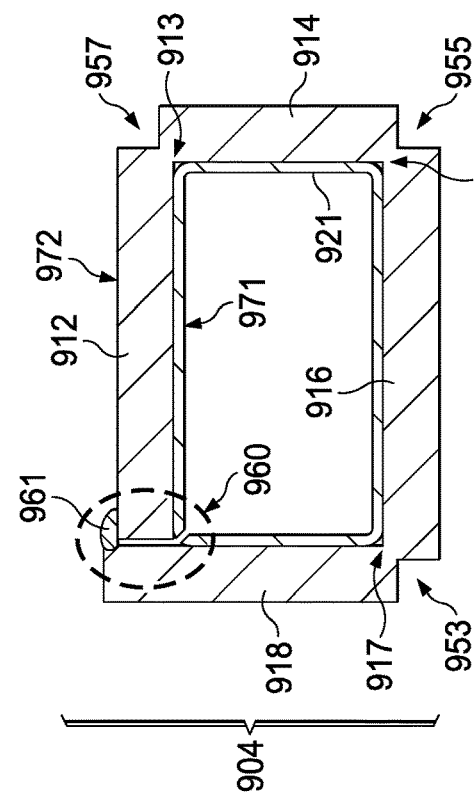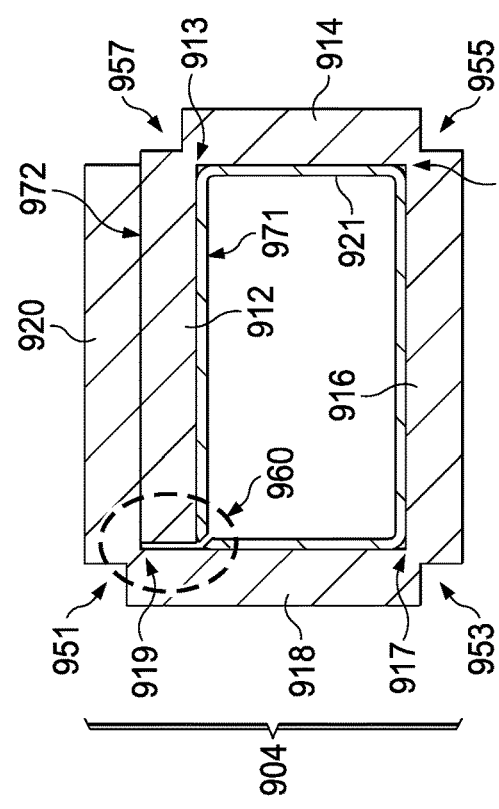

LIGHT TUNNEL

CROSS-REFERENCE TO RELATED APPLICATIONS

This application is a continuation-in-part of and claims the benefit under 35 U.S.C. § 120 to co-owned U.S. patent application Ser. No. 16/520,249 filed Jul. 23, 2019, which claims the benefit under 35 U.S.C. § 119(e) to U.S. Provisional Patent Application Ser. No. 62/702,739 filed Jul. 24, 2018. Also, this application claims the benefit under 35 U.S.C. § 119(e) to co-owned U.S. Provisional Patent Application Ser. No. 62/813,865 filed Mar. 5, 2019. The entireties of all of the above-identified applications are incorporated herein by reference.

TECHNICAL FIELD

This relates generally to optical engines, and more particularly to light tunnels used in optical engines.

BACKGROUND

Three-dimensional printing is useful in many fields, such as manufacturing and artistic design. The cost of three-dimensional printing is falling; thus, making more and more applications for this technology financially feasible. One type of three-dimensional printer is the photo-polymerization printer. This type of printer uses light to convert a liquid polymer to a solid. One type of photo-polymerization printer is a vat type. This type of printer uses a vat with a transparent bottom to contain photo-polymerizable liquid. Initially, a lift plate is one layer from the bottom of the vat. Each printer has a layer thickness that the printer develops, which may be tens to hundreds of microns thick. An optical engine is below the vat. The optical engine uses light to expose a pattern for the initial layer derived from a three-dimensional electronic model of the object to be printed. The light causes the liquid in the vat to polymerize in that pattern and thus form solid material. The lift plate then rises a layer and then exposes the next layer of the object. This process repeats until the printer forms all layers of the object.

With photo-polymerization printers, the optical engine can produce layers with very high resolution. For example, a digital light processing (DLP) optical engine can produce patterns with millions of pixels. However, such optical engines can be relatively expensive. To be competitive, the cost of the optical engine in this type of device should be lowered while maintaining high resolution output. A low cost optical engine can also be used in a variety of other applications beyond three dimensional printing, including automotive headlamps, projectors, ranging devices, and autonomous vehicle systems.

SUMMARY

In accordance with an example, a light tunnel is formed of a material, and the light tunnel includes: a first section having a first surface and an opposing second surface, a second section having a third surface and an opposing fourth surface, a third section having a fifth surface and an opposing sixth surface, and a fourth section having a seventh surface and an opposing eighth surface; a first crease between the first section and the second section, a second crease between the second section and the third section, a third crease between the third section and the fourth section, and an intersection between an end of the first section and the fourth section; and a reflective coating forming a reflective surface on the first, third, fifth and seventh surfaces, the reflective surface being continuous across at least one of the creases, and the reflective coating being discontinuous at the intersection.

BRIEF DESCRIPTION OF THE DRAWINGS

FIGS. 5A through 5D (collectively "FIG. 5") are diagrams of an example light integrator.
FIGS. 9A-9E (collectively "FIG. 9") illustrate in a plan view, a second plan view, a cross section, and in two end views, light tunnels used in example arrangements.

DETAILED DESCRIPTION

Figure 1:
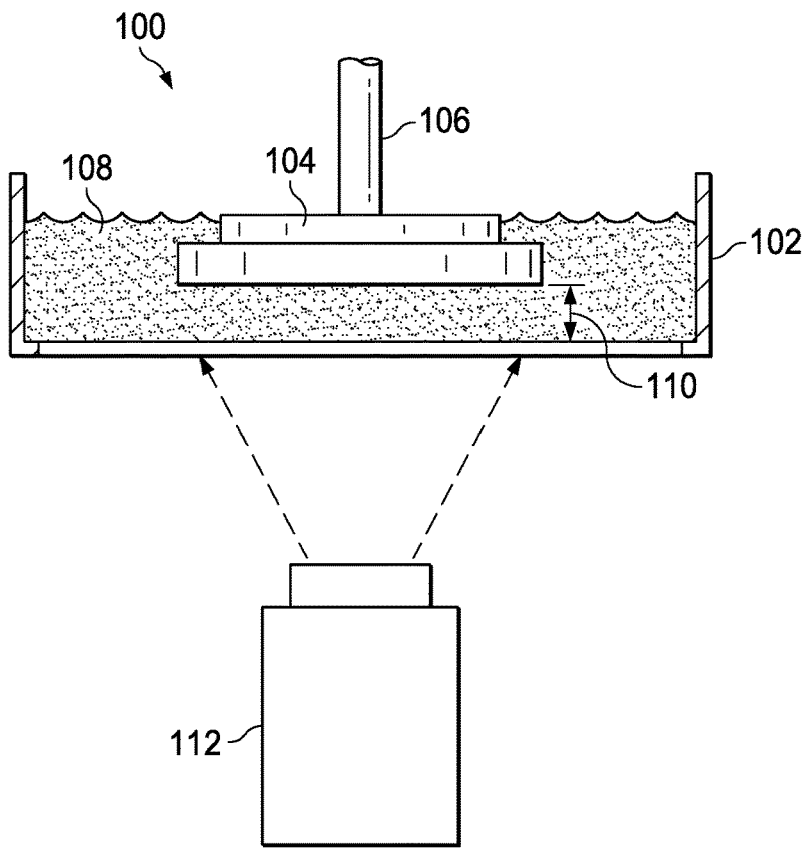
FIG. 1 is a diagram of a three-dimensional printer.

In the drawings, corresponding numerals and symbols generally refer to corresponding parts unless otherwise indicated. The drawings are not necessarily drawn to scale.

The term "coupled" is used herein. The term "coupled" may include connections made with intervening elements, and additional elements and various connections may exist between any elements that are "coupled." Elements are referred to herein as "optically coupled" when a connection between the elements involves transmission or reception of light.

The term "matches" is used herein in reference to projection optics and to the divergence of modulated light. As used herein, a focal point of a projection optics "matches" the divergence of modulated light when the focal point of an input of the projection optics is approximately within ±10% (as measured by the distance from the input of the projection optics to the focal point of the input of the projection optics) of the focal point of the modulated light.

The term "light tunnel" is used herein. As used herein, a light tunnel is an element that has two open ends. Light entering one end is reflected internally and directed to the opening at the opposite end. The term "light integrator" is used herein. As used herein, a light integrator is an element in an optical system that receives non-collimated light at an input and outputs divergent light. A light tunnel is an example of a light integrator.

The term "reflective surface" is used herein. As used herein, a reflective surface is an interface where at least 70% of the incident light energy is reflected within the desired wavelength and angle range. In particular examples of the arrangements, reflective surfaces are used that have a minimum total reflectivity of greater than 94%.

The term "crease" is used herein. As used herein, a crease is a line or ridge formed in a material by folding. In the example arrangements, creases are formed between sections of a light tunnel when a material of the light tunnel is folded.

In example arrangements, the problem of providing a low cost, efficient light tunnel for use in providing illuminating light to a spatial light modulator is solved by using a sheet of reflective material to form the light tunnel with an interior surface of the reflective material. The problem of providing a low cost, high quality optical engine is solved by using the light tunnel to direct light from a light source to a spatial light modulator, which avoids the need for additional lenses between the light source and the spatial light modulator. In an example arrangement an optical device includes a light source having configured to output light at a light source output. The optical device also includes a light tunnel with a light tunnel input and a light tunnel output with the light tunnel input optically coupled to the light source output. The light tunnel is formed from a piece of reflective material and is configured to provide divergent light at the light tunnel output responsive to light at the light source output. The optical device also includes projection optics having an optics input and an optics output. The projection optics is configured to project projection output light at the optics output responsive to modulated light at the optics input. A focal point of the optics input matches a divergence of the modulated light and a spatial light modulator optically coupled between the light integrator output and the optics input of the spatial light modulator. The spatial light modulator is configured to provide the modulated light responsive to the divergent light. The light tunnel can be used with any illumination source to provide divergent light to a spatial light modulator. In an example described hereinbelow, the light engine is used as part of a three-dimensional printer. The light engine can be used in a variety of applications including, as examples, the three dimensional printer, ranging systems, an automotive headlamp, and projectors.

FIG. 1 is a diagram of a three-dimensional printer 100. Three-dimensional printer 100 prints a three-dimensional object layer-by-layer from an electronic model of the object. Vat 102 has a transparent bottom. Lift plate 104 is positioned in vat 102 by control arm 106. Vat 102 is filled with photo-polymerizing resin 108. Control arm 106 positions lift plate 104 a layer thickness 110 from the bottom of vat 102. In examples, the layer thickness is 0.05 to 0.15 mm. When the lift plate is in position, optical engine 112 projects light in a pattern of the first layer of the object to be printed. Where light from the optical engine 112 strikes photo-polymerizing resin 108, photo-polymerizing resin polymerizes and forms solid material. Thus, the first layer of the object to be printed is formed.

The first layer adheres to lift plate 104. Lift plate 104 is then lifted by another layer thickness 110. In some examples, control arm 106 lifts, twists and/or tilts lift plate 104 to release the first layer from the bottom of vat 102. When the lift plate 104 is in position for the next layer of the object to be printed, optical engine 112 projects light in the pattern of the next layer of the object to be printed. This process repeats until all layers of the object are printed.

Figure 2:
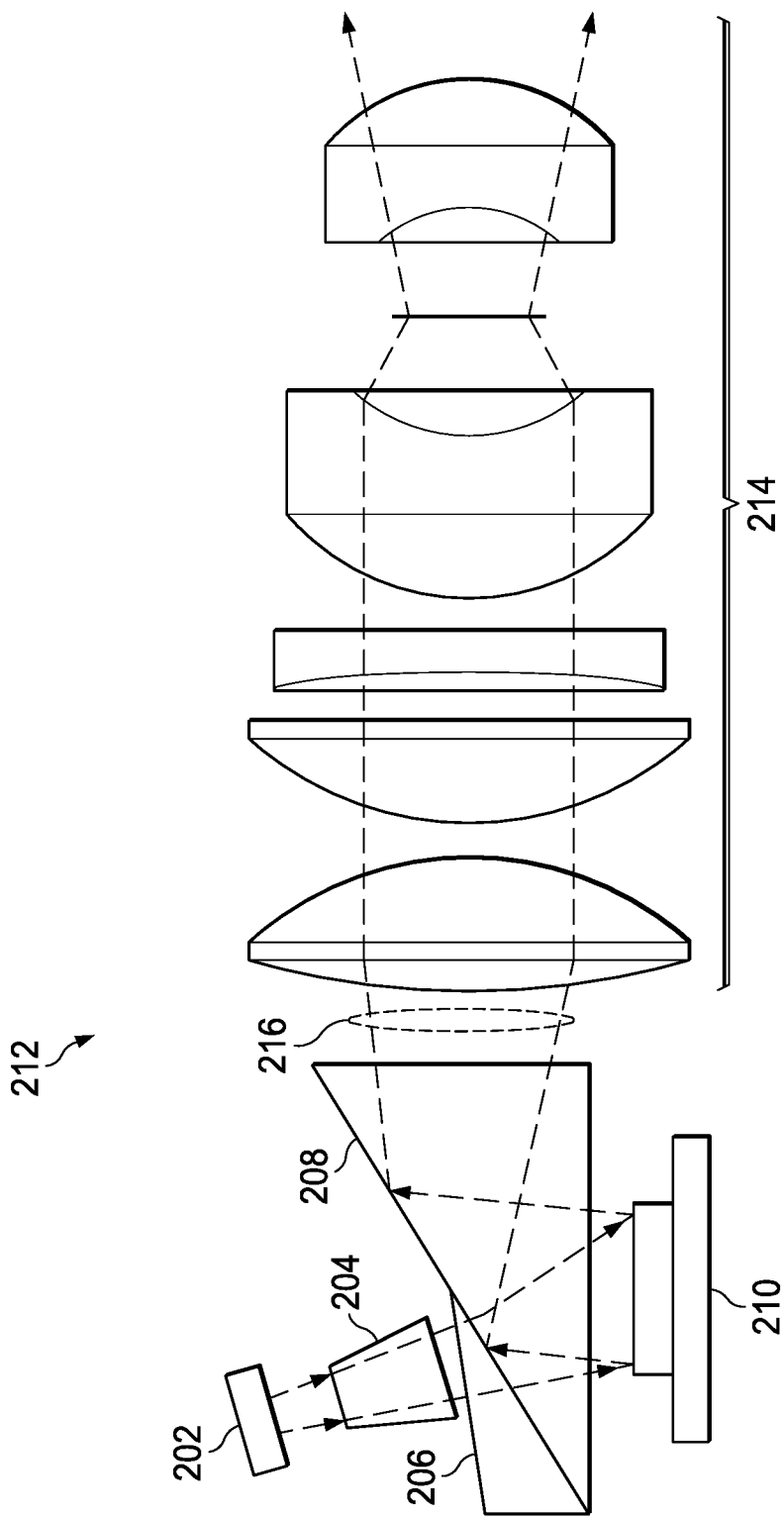
FIG. 2 is a diagram of an example optical engine.

FIG. 2 is a diagram of an example optical engine 212. Optical engine 212 is like optical engine 112 (FIG. 1). Light source 202 is a light emitting diode (LED) in this example. In other examples, light source 202 is another source of light, such as a high intensity incandescent light. In this example, the LED produces 1255 mW of optical power. The wavelength of light produced by light source 202 is selected for efficient polymerizing photo-polymerizing resin 108 (FIG. 1). In this example, light source 202 produces light of approximately 405 nm. In other examples, light source 202 produces light in a range of 350-460 nm. In many light sources for optical engines, light from the light source is collimated at the output of the light source. However, this requires additional lenses at the output of light source 202. In this example, the light integrator input of light integrator 204 is proximate to light source 202, and thus the light integrator input of light integrator 204 optically couples to light source 202. This captures as much light as possible without the need for collimating lenses. In addition, in this example, the form factor of the light integrator input of light integrator 204 is approximately the same as the form factor of the light source output of light source 202, which increases the portion of light from light source 202 that enters light integrator 204.

The light integrator output of light integrator 204 is larger than the light integrator input of light integrator 204. As explained further hereinbelow, this configuration lowers the spread of light from the light integrator output of light integrator 204 so that the light is efficiently provided to spatial light modulator 210. Light integrator 204 homogenizes the light from light source 202 by multiple reflections of the light inside light integrator 204. In addition, light integrator 204 helps direct as much light as possible onto spatial light modulator 210. As used herein, the term "light integrator" includes light tunnels, integrating rods, light pipes, and compound parabolic concentrators. Although other types of devices perform light integration, such as micro-lens arrays, these other types of devices are not included in the term "light integrator" as used herein. In this example, light integrator 204 is a light tunnel.

Divergent light from the light integrator output of light integrator 204 passes through cover prism 206. The divergent light from the light integrator output of light integrator 204 has a form that roughly matches the form factor of spatial light modulator 210. Cover prism 206 provides a surface that is perpendicular to the propagation path of the output of light integrator 204 to lower distortion of the form of light output from light integrator 204. In addition, the higher refractive index of cover prism 206 relative to air lowers the divergence of the light from the output of light integrator 204. The light then passes through an air gap (not shown) and through reverse total internal reflection prism (RTIR prism) 208. Thus, the light integrator output of light integrator 204 optically couples to spatial light modulator 210. In this example, spatial light modulator is a digital micromirror device (DMD). Other examples use other spatial light modulators, such as liquid crystal on silicon (LCOS) modulators. With DMDs, each pixel is a movable mirror that modulates light by reflecting in an ON direction and an OFF direction, depending on the data for that pixel provided to the DMD. The angle of the surface of RTIR prism 208 closest to light integrator 204 is such that it reflects ON direction light from pixels reflecting of spatial light modulator 210 but does not reflect light from light integrator 204. Therefore, the image for projection reflects from RTIR prism 208 to projection optics 214, and thus spatial light modulator 210 optically couples to the optical input of projection optics 214. As noted above, the light from light source 202 is not collimated before light integrator 204. As explained further hereinbelow regarding FIGS. 3 and 4, the light exiting light integrator 204 is divergent. The pixels of spatial light modulator 210 are mirrors, therefore modulated light 216 is also divergent as it enters the optical input of projection optics 214. Projection optics are often telecentric and thus are designed for non-divergent and non-convergent (i.e. collimated) light that has an infinite input focal distance. In this example, modulated light 216 is divergent, so projection optics 214 must have an input focal point directed to the point of divergence, and thus is non-telecentric. Because light integrator 204 modifies the divergence of the light from light source 202, the point of divergence or input focal point is calculated using the angle of divergence of the light at the output of light integrator 204. Therefore, the focal point of the optics input of projection optics 214 matches the divergence of modulated light 216. As used herein, a focal point of the projection optics 214 "matches" the divergence of the modulated light 216 when the focal point of the input of projection optics 214 is approximately within ±10% (as measured by the distance from the input of the projection optics 214 to the focal point of the input of the projection optics 214) of the focal point of the modulated light 216. In other words, the focal point of the projection optics 214 matches the modulated light 216 when the projection optics 214 approximately converts the divergent modulated light 216 to telecentric light. The optics output of projection optics 214 focuses on a target. That is, the focal point of the optics output of projection optics 214 is on the photo-polymerizing resin 108 (FIG. 1) between the lift plate 104 (FIG. 1) and the bottom of vat 102 (FIG. 1). In an example, projection optics 214 may include five lenses using N-BK7 glass. In this example, the five lenses are spherical. In an example, projection optics 204 has an f-number of 3.

Figure 3:
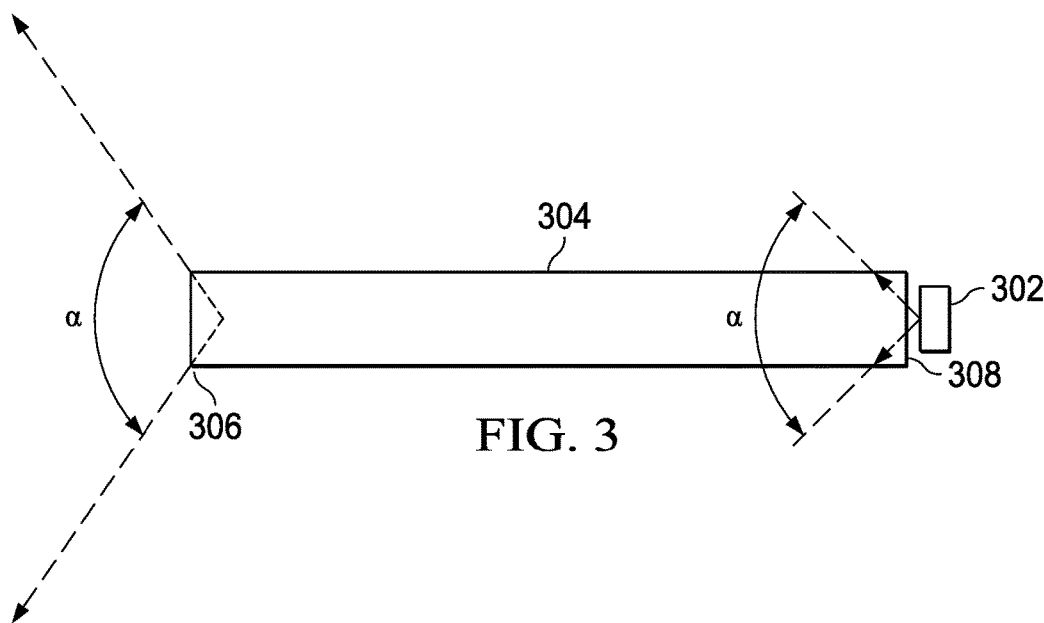
FIG. 3 is a diagram of a light integrator.

FIG. 3 is a diagram of another light integrator 304 where the output face 306 has the same size as the input face 308. With a light source 302 in proximity to input face 308, the full spread angle α of the light output from light source 302 enters light integrator 304. In this configuration, light integrator 304 cannot be a light rod unless the light rod has mirror coated surfaces. This is because, the angle of reflection for the light from light source 302 is too great for total internal reflection (TIR). Therefore, without reflective surfaces, too much of the output of light source 302 would pass through the walls of light integrator 304 and not propagate to output face 306. Because the walls of light integrator 304 are parallel to the propagation direction of the light, the output spread angle is also α.

Figure 4:
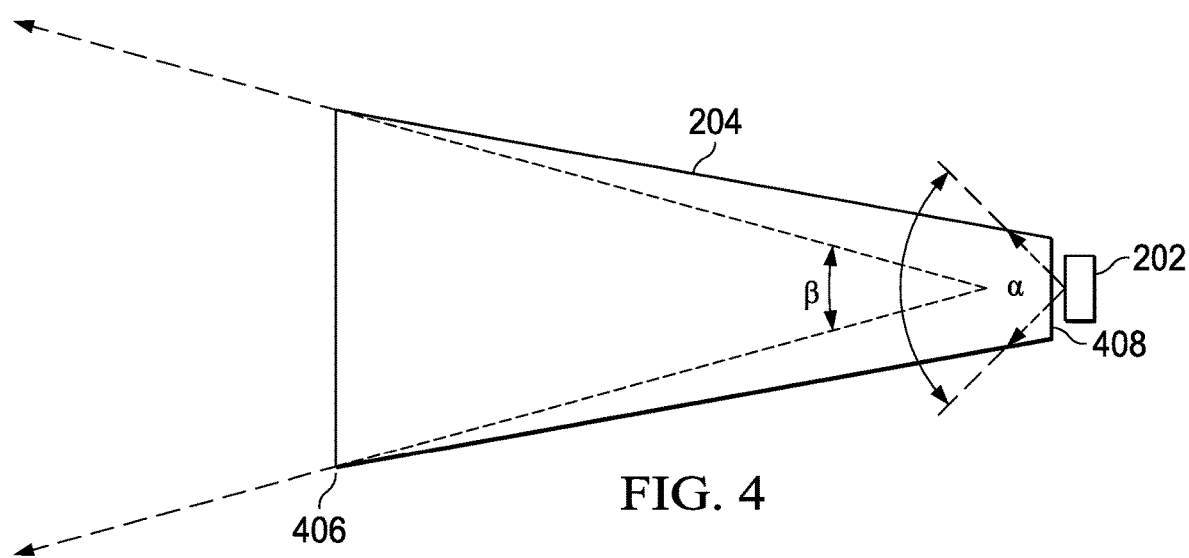
FIG. 4 is a diagram of an example light integrator.

FIG. 4 is a diagram of an example of light integrator 204. In this example, output face 406 is larger than input face 408. Light source 202 provides light having a spread of α. However, because the walls of light integrator 204 are not parallel to the propagation direction of the light, light from light source 202 reflects at a more oblique angle. Therefore, the output spread angle β is a smaller angle than α. This smaller angle lowers the divergence of the light from output face 406 and thus allows for provision of the light from light integrator 204 to a spatial light modulator like spatial light modulator 210 (FIG. 2) without redirection of the light by additional lenses. In addition, this configuration may allow for the use of TIR-based integrator rods because the angle of reflection of incoming light is more oblique. As used herein, the output of a light integrator like light integrator 204 is "divergent" when β is greater than 18° (i.e. the light diverges from the output light's propagation path by greater than 9°).

FIGS. 5A through 5D (collectively "FIG. 5") are additional diagrams of an example light integrator 204 (see also FIG. 2). FIG. 5A is a side view of light integrator 204. FIG. 5B is a top view of light integrator 204. FIG. 5C is a view of the output of light integrator 204. The size and configuration shown in FIG. 5C is an output form factor for light integrator 204. FIG. 5D is a view of the input of light integrator 204. The size and configuration shown in FIG. 5D is an input form factor for the light integrator 204. As used herein, the terms "top" and "side" only indicate the relative position of views and do not indicate any other physical relationship. Light integrator 204 has a length L. The input of light integrator 204 has a height $H_i$ and a width $W_i$. The output of light integrator has a height $H_o$ and a width $W_o$. In an example, the input of light integrator 504 is square, thus $H_i=W_i$. In an example, the size and form factor of the input of light integrator 204 matches the size and form factor of the input light source, like light source 202 (see FIG. 2), so that light integrator 204 captures the as much of the output of the light source as possible. Thus, if the output window of a light source, such as an LED, is a square that is 1 mm on each side, $H_i$ and $W_i$ would be about 1 mm, for example. In an example, L is about eight times the greater of $H_i$ and $W_i$. Thus, if H, is 1 mm, L would be 8 mm. However, in other examples, L is up to twenty times $H_i$ or $W_i$. In an example, L is approximately 20 mm for a 1 mm×1 mm input opening for a light integrator.

$H_o$ and $W_o$ are selected to match the aspect ratio or form factor of the spatial light modulator to be illuminated, such as spatial light modulator 210 (FIG. 2). The size of these dimensions involves a trade-off. The greater these dimensions are relative to the dimensions of the input of light integrator 204, the less the output light diverges. However, greater dimensions affect the uniformity of the output light and reduces the efficiency of light integrator 204. Another important design consideration is fully illuminating the spatial light modulator. With this consideration, the output pattern of light integrator 204 should be greater than the size of the spatial light modulator so that the spatial light modulator is fully illuminated.

Figure 6A:
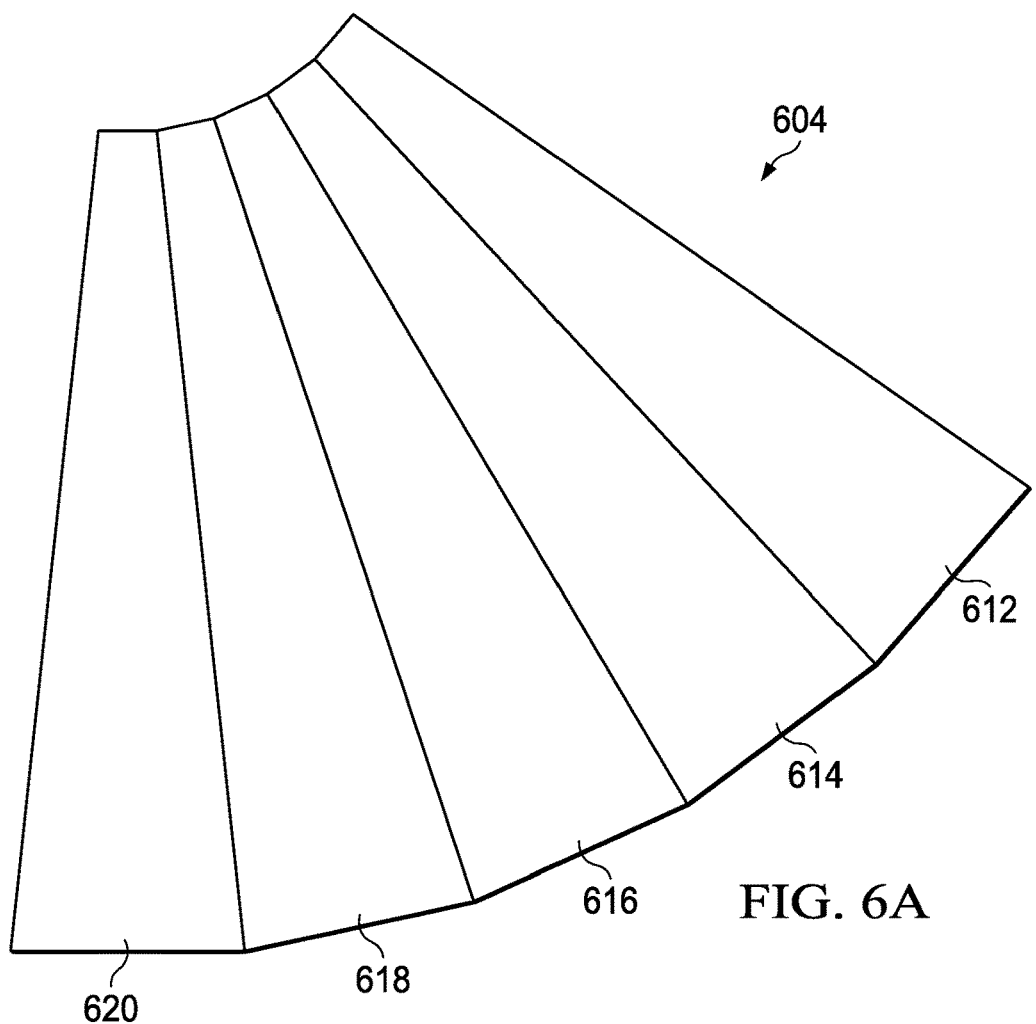
FIGS. 6A and 6B (collectively "FIG. 6") are diagrams illustrating an example method for making an example light integrator.
Figure 6B:
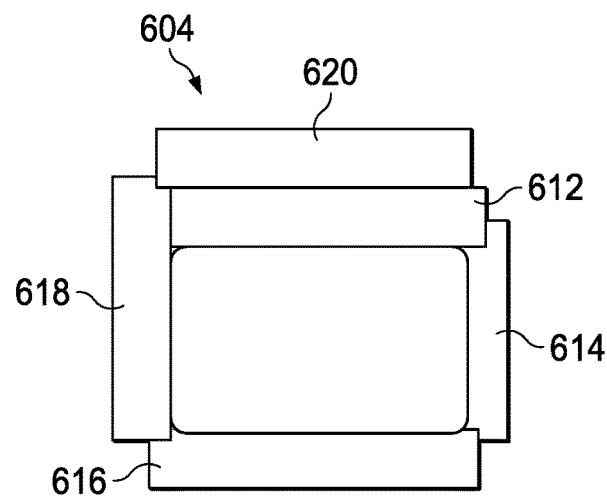

FIGS. 6A and 6B (collectively "FIG. 6") are diagrams illustrating an example method for making an example light integrator 604. The dimensions of FIG. 6 are not to scale, but rather are selected for ease of illustration. FIG. 6A shows example light integrator as a single sheet including a first section 612, a second section 614, a third section 616, a fourth section 618, and a fifth section 620. One surface of each of the sections includes a reflective surface, such as a layer of aluminum, silver or gold deposited on the surface of the sections. In an example, the example light integrator 604 is a sheet of aluminum. In the example, the sheet is folded at an angle of 90° at creases at the boundaries between sections such that the first section 612 and the fifth section 620 fold onto each other (see FIG. 6B which is an end view of the resulting light tunnel or integrator 604) as is further described hereinbelow. Thus, this example light integrator is easy to manufacture, and thus inexpensive.

Figure 7:
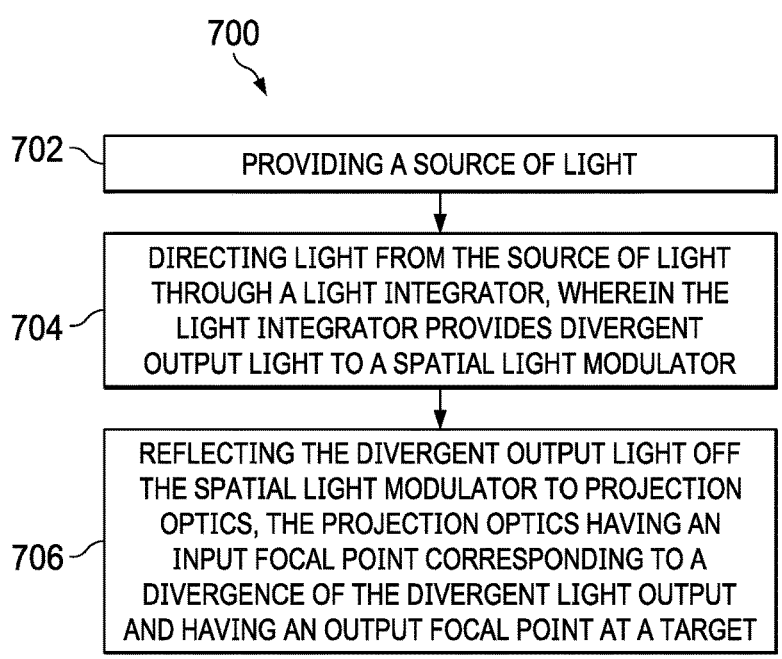
FIG. 7 is a flow diagram of an example method.

FIG. 7 is a flow diagram of an example method 700. Step 702 is providing a source of light, such as light source 202 (FIG. 2). Step 704 is directing light from the source of light through a light integrator, such as light integrator 204 (FIG. 2), wherein the light integrator provides divergent output light to a spatial light modulator. Step 706 is reflecting the divergent output light off the spatial light modulator, such as spatial light modulator 210 (FIG. 2) to projection optics, such as projection optics 214 (FIG. 2), the projection optics having an input focal point corresponding to a divergence of the divergent output light and having an output focal point at a target.

Figure 8A:
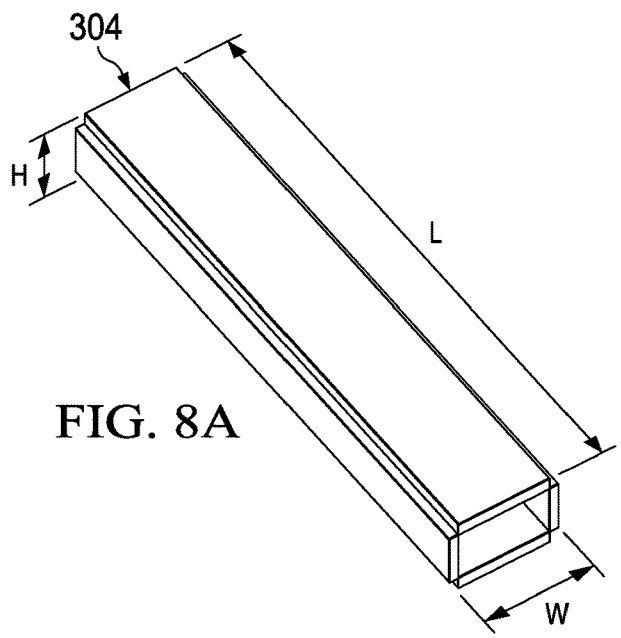
FIGS. 8A-8D (collectively "FIG. 8") are projection views of example arrangements forming light tunnels.
Figure 8B:
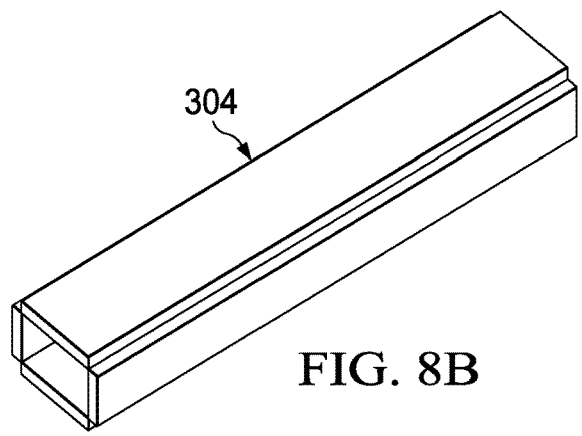

FIGS. 8A-8D (collectively "FIG. 8") illustrate example light integrator or light tunnel shapes that are useful in arrangements. In FIGS. 8A-8B, projection views show a rectangular light tunnel having a length, L, a width W, and a height, H. In an example, the light tunnel 304 is formed from a piece of material with reflective surface on at least the interior surface of the light tunnel. The material can be any material that can support the reflective coating with sufficient strength and which can be folded without breaking the material. The material can be metallic or nonmetallic. In an example, the material is an aluminum sheet material with a reflective coating forming a reflective surface. Examples include aluminum with silver or gold reflective coatings and aluminum with aluminum reflective coatings. Reflective dielectric layer coatings can be applied to a surface to form the reflective surface. A system of layered dielectrics with different reflective properties can be used to enhance reflectivity. Protective oxides can be formed over the reflective coatings to prevent scratches and to prevent corrosion or tarnish. Useful examples include a silver coated aluminum sheet material ANOLUX® 4270AG available commercially from Anomet Inc., and ANOLUX® Miro IV physical vapor deposition (PVD) enhanced aluminum coated sheet material available from the same source. These materials have a minimum total reflectivity of greater than 94% and up to 98%. Other reflective aluminum materials are also available from Anomet Inc. that can be used. Alternative materials include another material coated with reflective surfaces including dielectric coatings for reflectivity, or with a reflective metal coating such as silver, aluminum or gold. Examples include a base material such as aluminum, plastic, a board material such as a paper or cardboard, or other metals such as a copper metal. The material provides structural support for the reflective surface, in an example the material should be capable of being folded without severing the material. The reflective surface is formed by coating the material with a reflective coating such as reflective dielectric layer or layers, silver, aluminum or gold. Various oxide materials can be deposited over the reflective surface to enhance reflectivity and to protect the reflective materials, for example silicon dioxide can be deposited. E-beam deposition such as is used in physical vapor deposition (PVD) can be used to deposit the reflective coating. In the arrangements, the reflective surface has a minimum total reflectivity of at least 70%. In the example, the length L can be approximately 20 millimeters, but the length L can be varied vary to any length needed for any optical engine, a particular example has a width W that is about 5.2 mm and a height H that is about 4.6 mm. In this illustrated example the two dimensional area of an input end of the light tunnel 304 is the same as the two dimensional area of an output end. Because the two ends in this examples of FIG. 8A-8B have the same area, either end can be configured as the light tunnel input and the opposing end can be configured as the light tunnel output. The width W and height H can be varied as needed to provide divergent light to a particular spatial light modulator in an application.

Figure 8C:
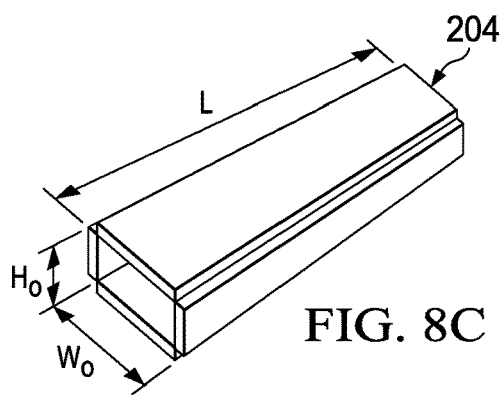

FIG. 8C is a projection view of a tapered arrangement for light tunnel 204 using a single piece of material with a reflective interior surface. The shape of the light tunnel 204 corresponds to the tapered shape described hereinabove. The output height $H_o$ and $W_o$ correspond, for example, to those in FIG. 5A for 204. In the tapered light tunnel arrangements, the cross section at any point along the length L is a rectangular area, with a width W greater to or equal to the height H. In a tapered example, the area of the light input end can be 1 mm×1 mm, and the light output end can be about 5.2×4.5 mm. In this example, the input end has a square area, and the output end has a rectangular area.

Figure 8D:
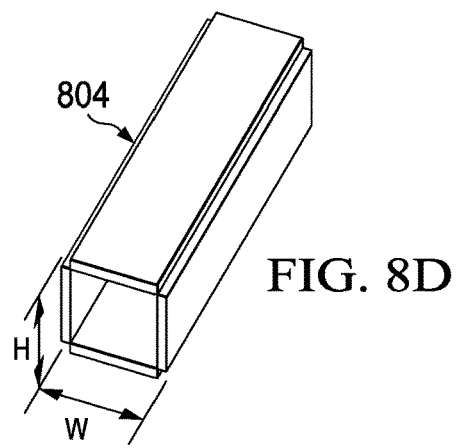

FIG. 8D is a projection view of another rectangular light tunnel 804 with a square cross section, the height H and width W in FIG. 8D are approximately equal or equal. The shape needed for an application can be determined by arranging the light tunnel with the spatial light modulator. The divergent light from the light tunnel output provides approximately uniform illumination across the spatial light modulator. Many spatial light modulator devices available, for example most DMD devices have a rectangular form factor. If instead a square aspect ratio spatial light modulator is needed for a particular application, then the light tunnel used can also be square in cross section, to assure a uniform illumination using the divergent light output by the light tunnel. Note that while the examples of FIG. 8 are each four sided or rectangular in cross section, in alternative arrangements the light tunnel can have 3, 4 or more sides. A general example of a light tunnel of the arrangements has N sides where N is an integer from 3 to 10. Triangular, rectangular, square, pentagonal, hexagonal, heptagonal etc. shapes can be used.

Figure 9A:
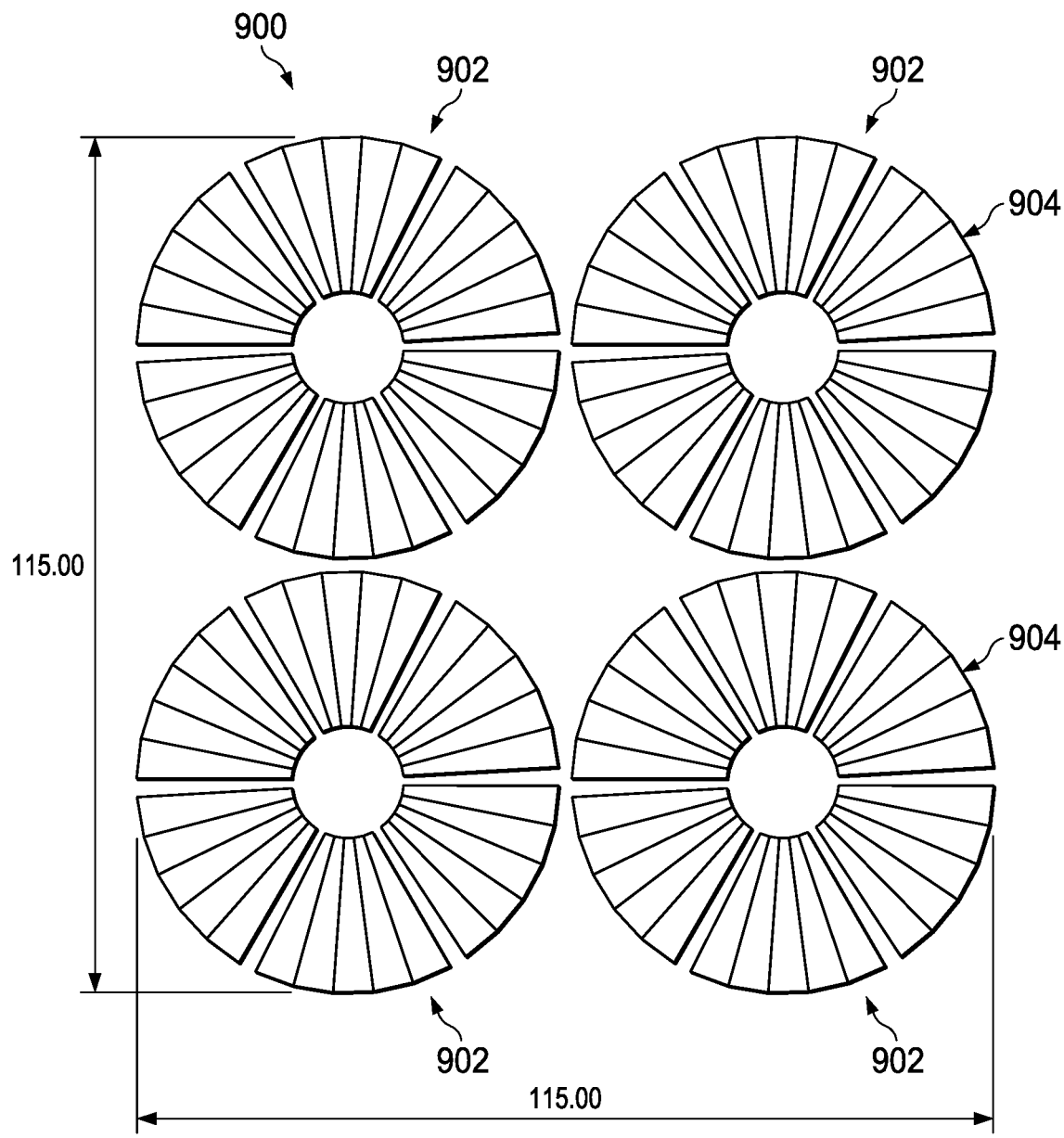

FIGS. 9A-9E (collectively "FIG. 9") are a plan view of piece of material 900 for forming light tunnels, a plan view of an individual light tunnel workpiece, a cross section of a light tunnel workpiece, and end views of light tunnels formed using the workpiece. In FIG. 9A, a cutting plan for wheel or "daisy" cut outs 902 is shown. A piece of material 900 with a reflective surface for use in forming the light tunnels is provided. The cutting plan shows a number of light tunnels 904 for each daisy cut-out 902. The light tunnels 904 are each grooved along a longitudinal direction on a backside opposite the reflective surface that will form the interior surface. At least the interior surface (not shown in FIG. 9A, as the backside is facing the viewer) has the reflective surface, although in an example a reflective aluminum is used for the flat material, which may have more than one reflective surface. In the illustrated example, each light tunnel 904 formed in the cutting plan has several grooves made in it in the backside surface. In an example, the grooves can be spaced about 100 microns apart for a 20 mm length light tunnel. The grooves can be formed in a milling operation, such as by using a precision metal router machine or milling machine. The grooves can be etched or cut prior to forming the daisy pattern, for efficiency of manufacture. Alternatively, the daisy patterns can be cut, and then each light tunnel piece 904 can be grooved in a milling operation. In an example process, the reflective surface is formed on the material prior to the cutting and grooving operations. In an alternative example, the material can be cut and grooved and then the individual light tunnel workpieces 904 can be coated with reflective surface. In the illustrated examples, the grooves define adjacent sections that are integral to one another, that is, the grooves define adjacent sections from a single piece of the material.

FIG. 9B shows in detail a plan view of the backside of a single light tunnel piece 904 after the cutting operations and the grooving operations are complete. In FIG. 9B, five tapered adjacent sections 912, 914, 916, 918, and 920 are formed. The first section 912 has a longitudinal edge along a first end of the material of light tunnel 904. The fifth portion 920 has a corresponding opposing longitudinal edge along a second end of the material of light tunnel 904. Four grooves 951, 953, 955, and 957 are formed into the backside surface of the light tunnel 904, each defining the intersection between the adjacent sections. The grooves extend into, but not through, the material of the light tunnel 904. In this example the material is a sheet of aluminum of a thickness of 0.5 millimeters. The grooves can be V or U shaped, or can have a rectangular shape, and can have depths ranging from 0.2-0.3 mm in the 0.5 mm thick material.

FIG. 9C is a cross section of the light tunnel 904 of FIG. 9B. Each of the sections 912, 914, 916, 918, 920 is spaced from the adjacent sections by a groove in the backside of the material 957, 955, 953, 951 respectively. The first section 912, for example, has a first surface 971 and a second surface, 972, the first surface has the reflective surface 921. Each of the other sections, second section 914, the third section 916, the fourth section 918, and the fifth section 920 also has a first surface that carries the reflective surface 921 and a second opposing surface, for clarity these are not given numerals. The reflective surface 921 includes the reflective coating, although in some examples the entire surface of the light tunnel, including the backside surface and the end edges, can also be reflective. The grooves are formed by a cutting or etching process and are of sufficient depth to enable the light tunnel 904 to be folded at each groove, but not to sever when folded. When the material is folded at each groove, a crease will form between the adjacent sections at a fold corresponding to the groove locations as is further described hereinbelow. The thickness of the light tunnel 904 is therefore made sufficient to enable the folding of the material without breaking or tearing to form the light tunnel body. In an example the material is aluminum and is 0.5 mm thick. Other thicknesses can be used depending on the material chosen.

FIG. 9D is a cross section of the light output end of the light tunnel 904. Each section 912, 914, 916, 918, and 920 now is a side of the rectangular tapered light tunnel 904, following a folding operation. In this four sided example, the material is folded at an angle of 90° at creases 913, 915, 917, 919 between adjacent sections. The grooves 957, 955, 953, 951 enable four folds where the creases are formed to form the body of the light tunnel. The reflective surface 921 becomes a continuous reflective interior surface of the light tunnel 904 that extends across creases 913, 915 and 917. Note that there is but a single assembly gap in the area 960 where a first end of the first section 912 intersects the interior surface of the fourth section 918. In this example the reflective surface 921 is continuous across the creases in light tunnel 904 with the exception of this assembly gap in the area 960 where reflective surface 921 is discontinuous. In this example arrangement, five sections (912, 914, 916, 918, and 920) are used with four grooves (957, 955, 953, 951) forming four folds at creases 931, 915, 917, and 919 to enable a four sided light tunnel 904, with the fifth section 920 overlapping the second or exterior surface 972 of the first section, 912, so that the single assembly gap in area 960 is covered by a portion of the interior surface of the fifth section, 920, and thus sealed. In this manner, the light reflecting inside the light tunnel 904 does not have any surface or gap where it can leak from the light tunnel and no exit other than the output end, so that the light tunnel is highly efficient and free from loss.

The four sided tunnel 904 is one example arrangement. The number of sides can be altered to form additional arrangements. The light tunnel can have N sides where N is a positive integer greater than 2. For example, a triangle has 3 sides where N equals 3, a pentagon has 5 sides where N equals 5. Useful examples can have up to 10 sides where N equals 10. For the light tunnel to be described in a general case, for a light tunnel with N sides there are at least N sections of the material. Each section has a first surface and a second surface opposite the first surface. N−1 creases are formed between the N sections, and an intersection is formed where the Nth section meets the first section. The intersection has an assembly gap that is then sealed. As shown in the example of FIG. 9D, the intersection can be sealed by further use of an N+1th section that overlaps the first section, so that a portion of the first surface of the N+1th section overlaps and seals the intersection. A reflective coating is deposited to form a reflective surface on the first surface of the material for each of the N (or N+1) sections, and the reflective surface is continuous over at least one of the creases. In the example of FIG. 9D, the reflective surface is continuous over the creases between the $1^{st}$ and 2nd, between the 2nd and between the 3rd, and the 3rd and $4^{th}$ sections, but is discontinuous at the intersection of the $4^{th}$ section (918) and the first section (912). The reflective surface is continuous across the 1, 2,-N−1 creases between the adjacent 1, 2,-N sections of an N sided light tunnel. In the examples, the N+1 sections are integral to one another, are formed from a single piece of the material, and the creases are made at locations where the grooves in the backside extend into, but not through, the piece of the material.

FIG. 9E is an alternative light tunnel arrangement with light tunnel 904 formed using only four sections (912, 914, 916, 918) of the material. In FIG. 9E, the single assembly gap in area 960 formed at the intersection of the fourth section 918 and the end of the first section 912 meets the interior surface of the fourth portion 918 is sealed using a brazed joint formed using a brazing rod, a weld 961 such as a TIG weld using a filler rod, an epoxy or another seam closure, this approach uses less of the material but is slightly less preferred to the arrangement shown in FIG. 9D. Both arrangements have a continuous reflective surface 921 that continues across the creases 913, 915, 917 and is discontinuous at an assembly gap in area 960 where the end of the first portion 912 intersects the surface of the fourth portion 918, the assembly gap is covered or sealed in both arrangements so that light cannot leak from the intersection, and both arrangements are cost effective, and highly efficient, with little or no possibility of loss of light.

To extend the arrangement of FIG. 9E to a more general example, in example arrangements a light tunnel has N sides where N is an integer between 3 and 10. The light tunnel has N sections of material. Each section has a first surface and a second opposing surface. The first section has an end of the material, and the Nth section has another end of the material. N−1 creases are formed between adjacent ones of the N sections, and an intersection is formed where the end of the first section meets the first surface of the Nth section. A seal is formed between the Nth section and the end of the first section to cover an assembly gap at the intersection. The first surfaces of each of the N sections have a reflective coating deposited on it to form a reflective surface. The reflective surface is continuous across at least one of the creases. The reflective surface in an example is continuous across each of the N−1 creases, and discontinuous at the intersection of the first section and the Nth section. The light tunnel can be a triangle, a square or rectangle, a pentagon, hexagon, heptagon, octagon, nonagon or decagon, with creases between the sections. As shown in FIG. 8C, the light tunnel can be tapered, with an opening at an input end having a smaller two dimensional area than an area of an opposite exit end. Alternatively, as shown in FIGS. 8A-8B and 8C, the light tunnel can have ends of equal area.

FIGS. 10A-10D is a series of views of an example tool and a method for folding a flat piece of reflective material to form a light tunnel arrangement. Note that although this illustrated example is for a light tunnel having four sides and using five sections, the example of FIG. 9D described hereinabove, the material could be folded in other ways to assemble the light tunnels.

Figure 10A:
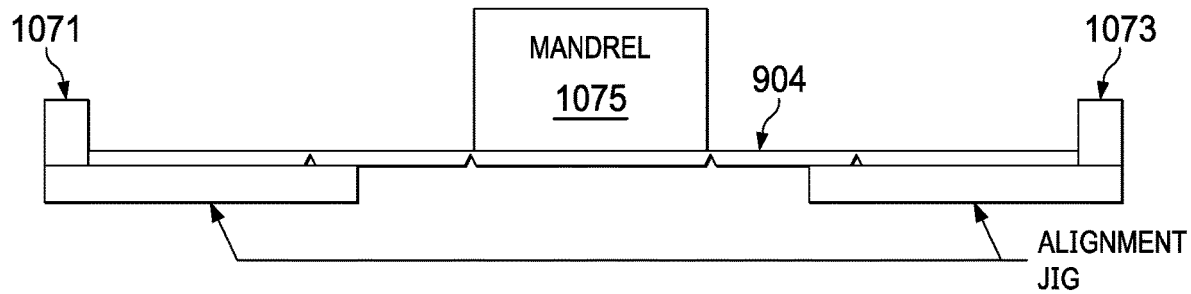
FIGS. 10A-10D (collectively "FIG. 10") illustrate in a series of views a sequence of steps for a method arrangement for forming light tunnels.

In FIG. 10A, a workpiece for a single light tunnel 904 is placed in a folding tool after the cutting and grooving operations shown in FIG. 9A above are completed. The backside of the material with the grooves is placed facing away from a mandrel 1075 in an alignment jig with ends 1071, 1073. The reflective surface (not shown for clarity of illustration) is facing the mandrel 1075.

Figure 10B:
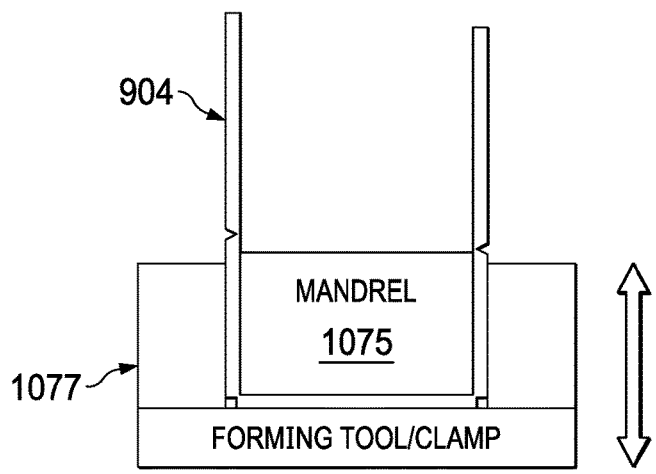

In FIG. 10B, a U-shaped folding clamp is forced upwards against the light tunnel 904 to fold the light tunnel along two grooves and form a U-shaped body with three sections having the reflective interior surface against the exterior surface of the mandrel 1075. Two creases are now formed at the corners of the light tunnel 904 that are at the lower end of the mandrel 1075.

Figure 10C:
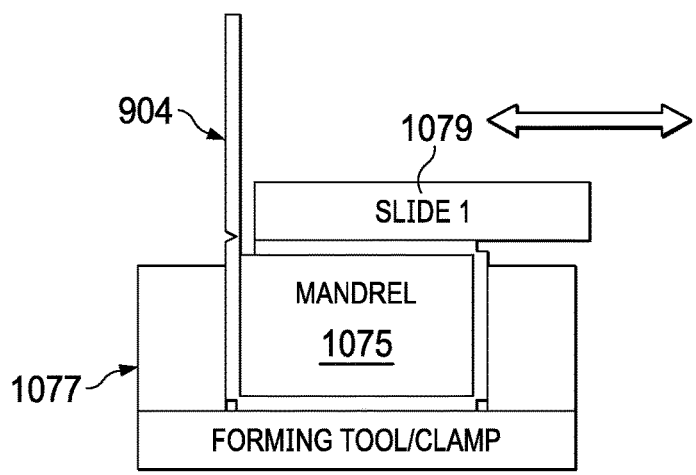

In FIG. 10C, a first slide tool 1079 folds the light tunnel 904 at a third groove so that the light tunnel 904 now has four sides against the four sides of the mandrel 1075. There are now three creases formed in light tunnel 904.

Figure 10D:
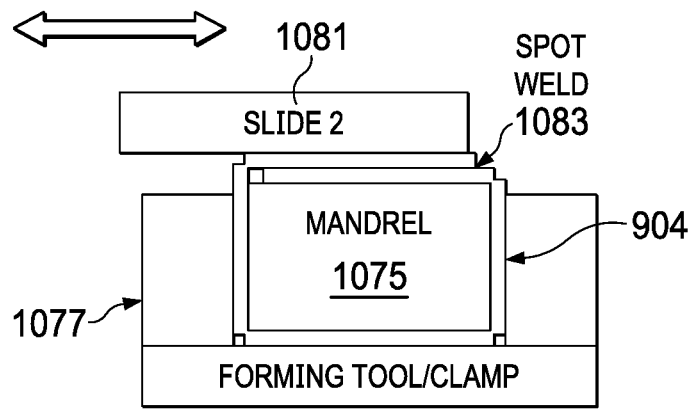

In FIG. 10D, a second slide tool 1081 folds the fifth section of the light tunnel 904 at a fourth groove to complete the overlap of the fifth section with the first section of the light tunnel, forming a fourth crease so that the five sections form the rectangular light tunnel 904, with the fifth section overlapping the exterior surface of the first section to complete the rectangle, see FIG. 9D. The single assembly gap formed where the end of the first section intersects the interior surface of the fourth section is then covered completely by the fifth section. A spot weld operation at the end of the fifth section then completes the assembly of the light tunnel 904. Example spot welds can be ultrasonic, Arc, Tig, or other weld types suitable for the material. Brazing with a brazing rod can be used. Welding with a filler rod can be used. Epoxy or other adhesive materials can be used. In this example, certain steps are described as examples in a particular order of steps, however alternative orders of the steps are contemplated as forming additional arrangements.

Figure 11:
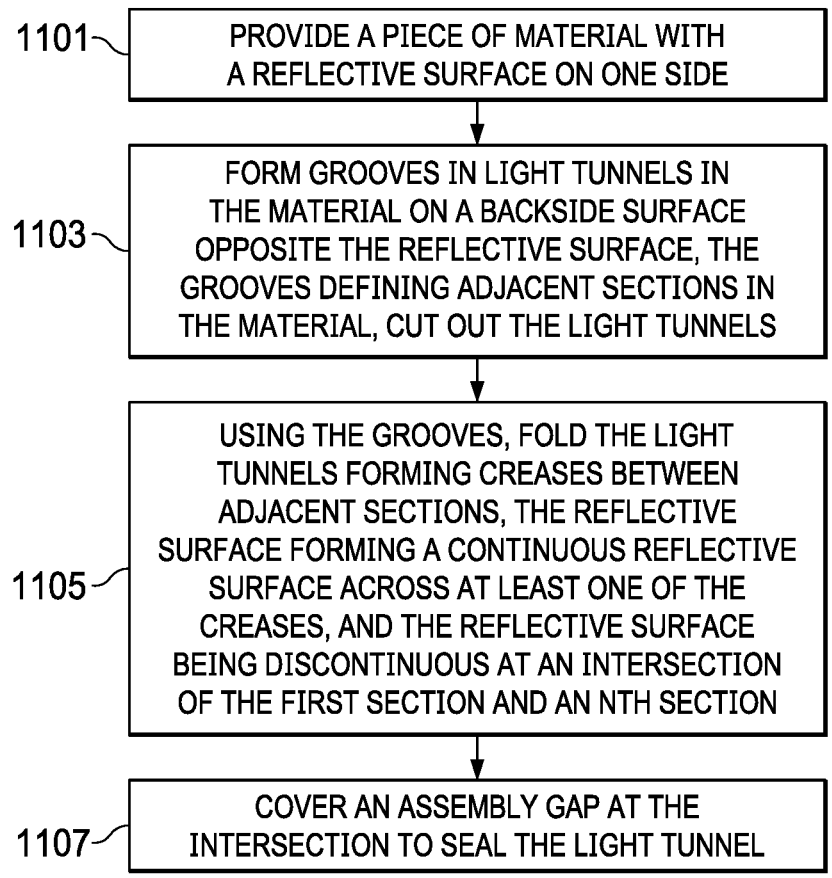
FIG. 11 is a flow diagram that illustrates the major steps of a method arrangement, such as the method shown in FIGS. 10A-10D.

FIG. 11 is a flow diagram showing the major steps of the method illustrated in FIGS. 10A-10D. In FIG. 11, at step 1101, a material is provided with a reflective coating forming a reflective surface on at least one side. The reflective surface will form the interior surface for the light tunnels.

At step 1103, the grooves are formed on the backside of the material and the light tunnels are cut from the material as shown in FIGS. 9A-9B above. The grooves define sections adjacent to one another. The light tunnels are then cut out from the material. As noted hereinabove, in an alternative method, the light tunnels could be cut out, and then the grooves could be formed.

At step 1105, the material is folded using the grooves to form the light tunnel having sections with creases between the sections, and having a continuous reflective interior surface with an assembly gap at an intersection of the first and the fourth, or Nth, section, as shown in FIGS. 10A-10C above.

At step 1105, the light tunnel assembly is completed by sealing the light tunnel assembly gap at the intersection by attaching the light tunnel material to itself, for example as shown in FIG. 10D, by forming a spot weld in an overlapping portion, or as shown in FIG. 9E, by forming a weld or seal covering the assembly gap along the longitudinal edge of the material.

The light tunnels using the reflective surface on the sheet materials are inexpensive, do not require optical glass or other optical materials, are accurate, are efficient, and are inexpensive to manufacture. These characteristics enable low cost, efficient optical engines using the arrangements.

Modifications are possible in the described examples, and other examples are possible, within the scope of the claims.

What is claimed is:

1. An apparatus, comprising:
   a light tunnel of a material, comprising:
   a first section having a first surface and an opposing second surface, a second section having a third surface and an opposing fourth surface, a third section having a fifth surface and an opposing sixth surface, and a fourth section having a seventh surface and an opposing eighth surface;
   a first crease between the first section and the second section, a second crease between the second section and the third section, a third crease between the third section and the fourth section, and an intersection between an end of the first section and the seventh surface of the fourth section; and
   a reflective coating forming a reflective surface on the first, third, fifth and seventh surfaces, the reflective surface being continuous across at least one of the first, second and third creases, and the reflective coating being discontinuous at the intersection.

2. The apparatus of claim 1, and further comprising a seal closing an assembly gap between the end of the first section and the seventh surface of the fourth section at the intersection.

3. The apparatus of claim 2, wherein the seal is a brazed joint, a weld, or epoxy.

4. The apparatus of claim 1, wherein the light tunnel further comprises:
   a fifth section of the material having a ninth surface and an opposing tenth surface; and
   a fourth crease between the fourth section and the fifth section, the ninth surface of the fifth section at least partially overlapping the second surface of the first section and covering an assembly gap at the intersection.

5. The apparatus of claim 4, further comprising a seal attaching the ninth surface to the second surface.

6. The apparatus of claim 5, wherein the seal is a brazed joint, a weld, or epoxy.

7. The apparatus of claim 1, wherein the material is aluminum, copper, paper, plastic, or cardboard.

8. The apparatus of claim 1, wherein the material is an aluminum sheet having a thickness of approximately 0.5 millimeters.

9. The apparatus of claim 1, wherein the reflective coating is silver, aluminum, gold, a reflective dielectric layer, or a combination of these.

10. The apparatus of claim 9, wherein the reflective coating further comprises a protective oxide layer.

11. The apparatus of claim 1, wherein the light tunnel has a first opening with a first area and a second opening with a second area greater than the first area.

12. The apparatus of claim 1, wherein the light tunnel has a first opening at a first end configured to receive light and a second opening at a second opposing end configured to transmit divergent light.

13. The apparatus of claim 1, wherein the light tunnel is a rectangular body having a length greater than a width and having a height.

14. The apparatus of claim 13, wherein the width and the height are approximately equal and the rectangular body has a square cross section.

15. The apparatus of claim 13, wherein the width is greater than the height and less than the length, and the rectangular body has a rectangular cross section.

16. The apparatus of claim 15, wherein the light tunnel has a square first end opening and a rectangular second end opening.

17. The apparatus of claim 16, wherein the first end opening has a height and a width of approximately 1 millimeter, and the second end opening has a height of approximately 4.6 millimeters and a width of approximately 5.2 millimeters, and the light tunnel has a length of approximately 20 millimeters.

18. An apparatus, comprising:
   a light tunnel of a material having N sides, where N is an integer between 3 and 10, comprising:
      N sections of the material, each section having a first surface and an opposing second surface, the N sections being adjacent to one another;
      N−1 creases between adjacent sections from between the first section and the second section to between the (N−1)th section and the Nth section, and an intersection between an end of the material in the first section and the first surface of the Nth section, the intersection forming an assembly gap;
      a reflective coating on the first surfaces of each of the N sections forming a reflective surface, the reflective surface being continuous across at least one of the N−1 creases, and the reflective coating being discontinuous at the assembly gap; and
      a seal covering the assembly gap at the intersection.

19. The apparatus of claim 18, wherein the N sections are integral to one another.

20. The apparatus of claim 18, the light tunnel further comprising:
   an (N+1)th section of the material having a first surface and a second opposing surface;
   an Nth crease between the Nth section and the (N+1)th section, the first surface of the (N+1)th section overlapping the second surface of the first section, and covering the assembly gap at the intersection; and
   a seal attaching the first surface of the (N+1)th section to the second surface of the first section.

21. The apparatus of claim 20, wherein the N+1 sections are integral to one another.

22. A method, comprising:
   forming longitudinal grooves on a backside surface of a material to define N adjacent sections, where N is an integer between 3 and 10, the material having a reflective coating to form a reflective surface on a front surface of each of the N adjacent sections opposite the backside surface;
   forming a light tunnel by forming N−1 creases between adjacent ones of the N sections at locations corresponding to the longitudinal grooves, the reflective surface being continuous across at least one of the N−1 creases, with an assembly gap at an intersection where one end of the first section meets the reflective surface of the Nth section; and
   sealing the assembly gap at the intersection.

23. The method of claim 22, wherein the N sections are integral to one another.

24. The method of claim 22, wherein sealing the assembly gap further comprises:
   forming a longitudinal groove in the backside of the material to define an (N+1)th section of the material adjacent the Nth section;
   folding the (N+1)th section at an Nth crease between the Nth section and the (N+1)th section to cover the assembly gap at the intersection, the (N+1)th section overlapping a backside surface of the first section; and
   attaching the (N+1)th section to the backside surface of the first section.

25. The method of claim 22, wherein the reflective coating is formed from silver, aluminum, gold, reflective dielectric layers, or combinations thereof.

26. The method of claim 22, wherein the material comprises a metal of aluminum, silver or copper, paper, cardboard, or plastic.

27. The method of claim 22, wherein N equals 4 and the light tunnel has 4 sides.

28. The method of claim 24, wherein N equals 4 and the light tunnel has 4 sides.

29. An optical engine, comprising:
   a light source configured to provide light at a light source output;
   a light tunnel of a material configured to receive the light from the light source output, and to output divergent light at a light tunnel output, the light tunnel comprising:
      a first section having a first surface and an opposing second surface, a second section having a third surface and an opposing fourth surface, a third section having a fifth surface and an opposing sixth surface, and a fourth section having a seventh surface and an opposing eighth surface;
      a first crease between the first section and the second section, a second crease between the second section and the third section, a third crease between the third section and the fourth section, and an intersection between an end of the first section and the fourth section; and
      a reflective coating forming a reflective surface on the first, third, fifth and seventh surfaces, the reflective surface being continuous across at least one of the first, second and third creases, and the reflective coating being discontinuous at the intersection;
   projection optics having an optics input and an optics output, the projection optics configured to project projection output light at the optics output responsive to a modulated light at the optics input, in which a focal point of the optics input matches a divergence of the modulated light; and
   a spatial light modulator optically coupled between the light tunnel output and the optics input, the spatial light modulator configured to provide the modulated light responsive to the divergent light.

* * * * *